Patented July 7, 1942

2,288,752

UNITED STATES PATENT OFFICE 2,288,752

PURIFICATION OF PHOSPHORIC ACID

George S. Simpson, Plainfield, N. J., assignor to General Chemical Company, New York, N. Y., a corporation of New York No Drawing. Application May 17, 1939,
Serial No. 274,103

2 Claims. (Cl. 23—165)

This invention relates to the purification of phosphoric acid, particularly the removal of iron compounds from partially purified concentrated phosphoric acid.

Phosphoric acid prepared by the usual commercial processes, e. g., treatment of phosphate rock with sulfuric acid, usually contains objectionable impurities. Iron compounds are among the more difficult of these impurities to remove. Certain processes have been proposed for the purification of crude phosphoric acid, e. g., extraction of the acid by solvents and separation of the acid-solvent mixture from the impurities. Such processes ordinarily only partially remove the iron compounds and may produce partially purified acid containing, for example, iron in amount of the order of .1 per cent calculated as $Fe_2O_3$. Such amounts of iron are detrimental to use of the acid for some purposes such as the preparation of foods. It is desirable that phosphoric acid used as ingredients of foods contain .04 per cent or less of iron calculated as $Fe_2O_3$.

It is an object of this invention to provide a novel process for the efficient removal of iron compounds from partially purified phosphoric acid.

It is a further object of the invention to provide a novel process for the expeditious removal of iron compounds from concentrated phosphoric acid. Other objects and advantages will appear hereinafter.

In accordance with the invention, phosphoric acid, preferably concentrated phosphoric acid, i. e., acid of a strength of 50 per cent or higher, containing a small amount of ferric iron as an impurity, is electrolyzed by passing an electric current through the acid until the iron is reduced to the ferrous state. The concentrated phosphoric acid is then mixed at an elevated temperature with sufficient beta-naphthalene sulfonic acid to react with all of the iron. I have discovered that where, as is usually the case, the phosphoric acid contains calcium as well as iron compounds, the beta-naphthalene sulfonic acid should be added in amount sufficient to react with both the calcium and the iron. Otherwise a portion of the iron compounds will be left unreacted. The treated phosphoric acid is then cooled, preferably to a temperature of about 15° C. to precipitate the iron as ferrous beta-naphthalene sulfonate and filtered to remove the precipitate. The resultant phosphoric acid is substantially free from iron.

In carrying the invention into effect, by way of example, 7400 parts by weight of 75 per cent ortho-phosphoric acid, containing 0.11 per cent of iron compounds calculated as $Fe_2O_3$, were heated to 40° C. in a lead vessel and electrolyzed by passing therethrough an electric current of from about 7 to 9 volts and 9 to 11 amperes until test with ammonium thiocyanate for ferric iron showed that the iron had been substantially completely reduced from the ferric to the ferrous state. The lead vessel served as the negative (reducing) electrode and a lead strip in a porous alundum diaphragm cup as the positive electrode. The calcium content of the acid was calculated, the acid heated to a temperature of from about 110 to 120° C. and an amount of beta-naphthalene sulfonic acid sufficient to react with both the calcium and the iron was added as a concentrated solution in hot water to 100 parts by weight of the acid, i. e., 2.87 parts by weight of beta-naphthalene sulfonic acid were added. The mixture was stirred until the reaction between the iron and beta-naphthalene sulfonic acid was complete, and then cooled to 15° C. and filtered. The iron separated on the filter as glistening plates of insoluble ferrous naphthalene beta-sulfonate. Analysis of the purified phosphoric acid showed an iron content of less than .0003 gram of iron compounds calculated as $Fe_2O_3$ per 100 cc. of the acid.

A surprising feature of the invention is the substantially complete reduction to the ferrous state of all of the small quantity of ferric iron present in partially purified phosphoric acid by passing an electric current through the acid. Attempts to reduce the iron with reducing agents such as calcium, zinc, hydrogen sulfide, sulfur dioxide, formaldehyde and carbon monoxide failed to accomplish complete reduction so that it was impossible to remove the iron completely from phosphoric acid by treating the acid with these reducing agents and then with beta-naphthalene sulfonate. Tests with ammonium thiocyanate indicated the iron was completely reduced by the electrolytic method.

In order to acomplish optimum removal of iron, I have found that phosphoric acid, concentrated to a strength of 50 per cent or higher, should be employed and the acid should be cooled, preferably to a temperature of not higher than 15° C., before filtering off the precipitated iron impurities. For example, the filtrates obtained by treating 20 per cent phosphoric acid containing ferrous iron with sufficient beta-naphthalene sulfonic acid to react with the iron, and filtering one portion of the acid at 15° C. and another portion at 25° C., contained, respectively, about 0.05 gram and 0.07 gram of iron calculated as $Fe_2O_3$ per 100 cubic centimeters of the filtrate. The filtrates obtained by treating 75 per cent phosphoric acid containing ferrous iron with sufficient beta-naphthalene sulfonic acid to react with the iron and filtration of one portion of the acid at 15° C. and another portion at 25° C. contained, respectively, about .0003 gram of iron and about .004 gram of iron, calculated as $Fe_2O_3$ per 100 cubic centimeters of acid.

Since it was known that ferrous beta-naphthalene sulfonate is soluble in cold water to the extent of about .5 per cent, my discovery that the iron content of concentrated phosphoric acid can be reduced to below .04 per cent of iron calculated as $Fe_2O_3$ by precipitating the iron in the form of ferrous beta-naphthalene sulfonate is indeed surprising because a chemist would expect that if anything ferous beta-naphthalene sulfonate would be more soluble in concentrated phosphoric acid solution than it is in water.

It is to be understood that since certain changes may be made in the above without departing from the scope of the invention, the disclosure should be interpreted in an illustrative and not in a limiting sense. For example, if the phosphoric acid being purified of iron is to be used for the manufacture of an alkali metal phosphate, the beta naphthalene sulfonic acid salt of that alkali metal may be used as the reagent for removing iron, in place of beta naphthalene sulfonic acid. The reference in the claims to beta naphthalene sulfonic acid is intended to include the salts of the acid as well as the acid per se.

I claim:

1. The process of purifying concentrated phosphoric acid of at least 50 per cent concentration containing iron compounds which comprises passing a direct electric current through the acid to reduce the iron to the ferrous state, treating the concentrated acid with beta-naphthalene sulfonic acid to precipitate the iron and removing the precipitate from the acid.

2. The process of removing iron compounds from concentrated phosphoric acid containing a small amount of ferric iron and calcium compounds which comprises passing a direct electric current through the acid until substantially all of the iron is reduced to the ferrous state, adding beta-naphthalene sulfonic acid in amount sufficient to react with both the iron compounds and the calcium compounds and after the reaction is substantially complete filtering the acid to remove precipitated iron therefrom while maintaining the acid at a temperature not substantially in excess of about 15° C.

GEORGE S. SIMPSON.